United States Patent
Yang et al.

(10) Patent No.: US 10,488,690 B2
(45) Date of Patent: Nov. 26, 2019

(54) DISPLAY DEVICE AND ASSEMBLING METHOD THEREOF

(71) Applicant: InnoLux Corporation, Jhu-Nan, Miao-Li County (TW)

(72) Inventors: Chih-Chiao Yang, Jhu-Nan (TW); Chia-Chun Yang, Jhu-Nan (TW); Chin-Cheng Kuo, Jhu-Nan (TW); Tong-Jung Wang, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/105,251

(22) Filed: Aug. 20, 2018

(65) Prior Publication Data

US 2019/0072810 A1 Mar. 7, 2019

(30) Foreign Application Priority Data

Sep. 7, 2017 (CN) .......................... 2017 1 0799473

(51) Int. Cl.
*G02F 1/1333* (2006.01)
*G02F 1/1335* (2006.01)
*F21V 8/00* (2006.01)

(52) U.S. Cl.
CPC ..... *G02F 1/133308* (2013.01); *G02B 6/0055* (2013.01); *G02B 6/0065* (2013.01); *G02B 6/0088* (2013.01); *G02F 1/133512* (2013.01); *G02F 2001/13332* (2013.01); *G02F 2001/133311* (2013.01); *G02F 2001/133314* (2013.01); *G02F 2001/133317* (2013.01); *G02F 2001/133325* (2013.01); *G02F 2202/28* (2013.01)

(58) Field of Classification Search
CPC ............ G02F 1/133308; G02B 6/0055; G02B 6/0065; G02B 6/0088
See application file for complete search history.

(56) References Cited

U.S. PATENT DOCUMENTS

2017/0261803 A1* 9/2017 Teramoto .......... G02F 1/133308

* cited by examiner

*Primary Examiner* — Thomas M Sember
(74) *Attorney, Agent, or Firm* — Muncy, Geissler, Olds & Lowe, P.C.

(57) ABSTRACT

A display device includes a display panel, a first frame, a second frame and an adhesive element. The first frame is disposed corresponding to the display panel and includes a bottom portion and a side wall. The bottom portion is connected to the side wall. The second frame is disposed on the first frame. The display panel is disposed on a part of the second frame. The adhesive element is disposed between the first frame and the second frame. The adhesive element contacts at least a part of the bottom portion and at least a part of the side wall. An assembling method of the display device is also provided.

19 Claims, 12 Drawing Sheets

DISPLAY DEVICE AND ASSEMBLING METHOD THEREOF

CROSS REFERENCE TO RELATED APPLICATIONS

This Non-provisional application claims priority under 35 U.S.C. § 119(a) on Patent Application No(s). 201710799473.6 filed in People's Republic of China on Sep. 7, 2017, the entire contents of which are hereby incorporated by reference.

BACKGROUND

Technical Field

The present disclosure relates to a display device and an assembling method thereof. In particular, this disclosure relates to a display device have better strength of structure, or an automatic assembly method for narrow border display device

Related Art

With the development of technologies, flat display devices have been widely applied to various fields. Due to the advantages such as low power consumption, less weight, compact size or less radiation, the liquid crystal display (LCD) devices have gradually replaced the traditional cathode ray tube display (CRT) display devices or been applied to various electronic products, such as mobile phones, portable multimedia devices, notebook computers, liquid crystal TVs or liquid crystal screens.

Regarding the manufacturing and assembling of LCD module, it is desired to develop the low-cost automatic production technology. In the assembling procedure of the conventional LCM, the components are usually fixed by adhesive sheets. In order to increase the yield of the attaching process, the steps of disposing the adhesive sheets or assembling are usually performed by manual method. However, this process is not conducive to the development of display devices towards automated production, the cost of adhesive sheets is relatively higher than the cost of glue.

In addition, if the adhesive sheets are applied to the assembling process of narrow border products, it is necessary to cut the adhesive sheets into a width less than 0.5 mm, but the process is very difficult. Accordingly, to assemble the components by adhesive sheets is not suitable for the automatic assembling production of narrow border modules. Besides, the mouth tape has some attaching yield problems, so it is not suitable for developing the automatic production or improving the product competitiveness.

SUMMARY

This disclosure provides a display device, which includes a display panel, a first frame, a second frame and an adhesive element. The first frame is disposed corresponding to the display panel, and the first frame includes a bottom portion and a side wall. The bottom portion is connected to the side wall. The second frame is disposed on the first frame, and the display panel is disposed on a part of the second frame. The adhesive element is disposed between the first frame and the second frame, and the adhesive element contacts at least a part of the bottom portion and at least a part of the side wall.

This disclosure also provides an assembling method of a display device, including steps of: reversing a second frame; disposing an adhesive element on a first frame, wherein the first frame comprises a bottom portion and a side wall, the bottom portion is connected to the side wall, and the adhesive element is disposed on at least a part of the bottom portion and at least a part of the side wall; reversing the first frame disposed with the adhesive element and placing on the second frame, wherein the adhesive element is located between the first frame and the second frame; and pressing the first frame, and making the adhesive element contact at least a part of the bottom portion, at least a part of the side wall and at least a part of the second frame.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements.

To make this disclosure more comprehensive, the drawings of the following embodiments define a first direction D1, a second direction D2 and a third direction D3, and any two of the first direction D1, the second direction D2 and the third direction D3 are substantially perpendicular to each other. The third direction D3 is the normal direction of the display panel.

Figure 1:
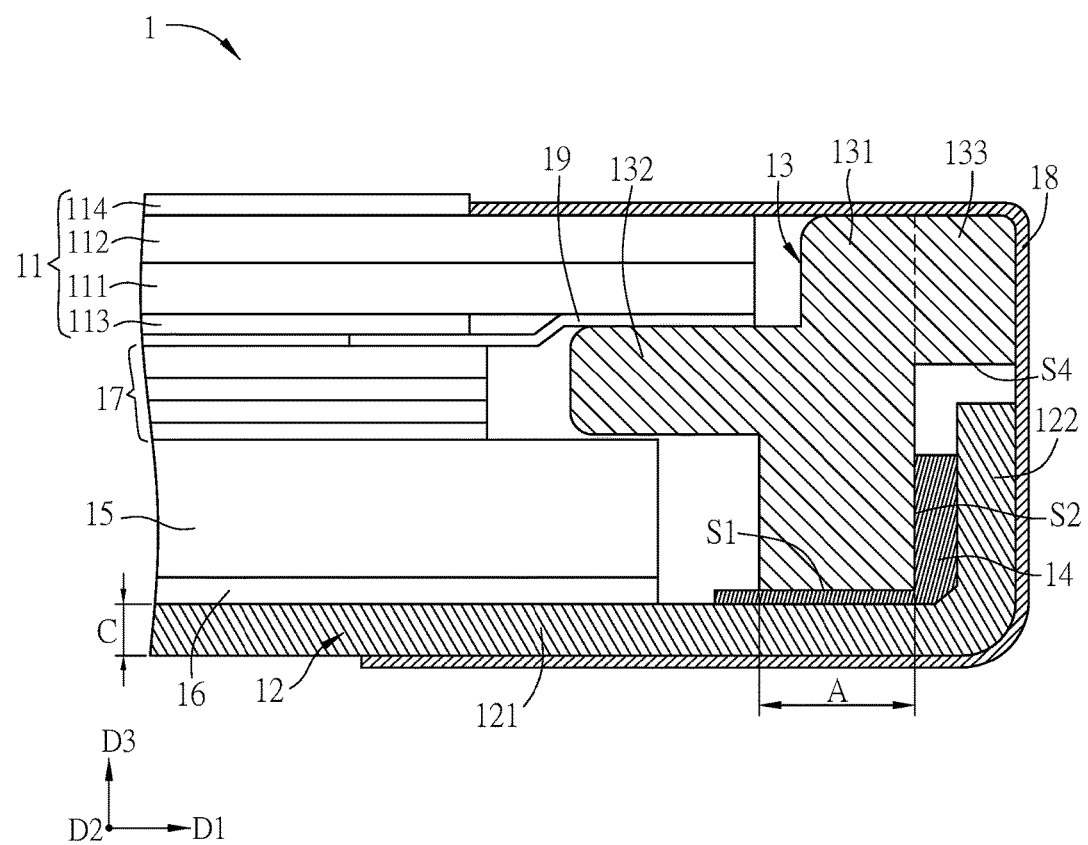
FIG. 1 is a schematic diagram showing a display device according to an embodiment of the disclosure.

FIG. 1 is a schematic diagram showing a display device 1 according to an embodiment of the disclosure. As shown in FIG. 1, the display device 1 may be liquid crystal display, Organic Light-Emitting diodes (OLED) display, micro LED, or mini LED display, but the disclosure is not limited thereto. Detailed description, LED chip size may be defined as the existing chip about 200 to 300 microns, LED chip size of small pitch display chip may be about 150 microns, LED chip size of Mini LED may be about 50 to 60 microns, Mini LED may be regarded as Micro LED predecessor, LED chip size of Micro LED may be only 15 microns. In this embodiment, the display device 1 is an LCD device.

Referring to FIG. 1, the display device 1 includes a display panel 11, a first frame 12, a second frame 13 and an adhesive element 14. Besides, the display device 1 can further include a light guiding element 15, a reflective element 16 or at least one optical film 17.

The display panel 11 can be an FFS (Fringe Field Switching) LCD panel, an IPS (In Plane Switching) LCD panel, a TN (Twisted Nematic) LCD panel, a VA (Vertical Alignment) LCD panel, or any of other types of LCD panels, and this disclosure is not limited. The display panel 11 includes a first substrate 111, a second substrate 112, a liquid crystal layer (not shown), a polarizer 113 and a polarizer 114. The first substrate 111 is disposed opposite to the second substrate 112, the liquid crystal layer is disposed between the first substrate 111 and the second substrate 112. In this embodiment, the first substrate 111 may be a TFT (thin-film-transistor) substrate, the second substrate 112 may be a CF (color filter) substrate. In other embodiments, the black matrix or the filter layer of the CF substrate can be disposed on the TFT substrate, the first substrate 111 may be a BOA (BM on array) substrate or a COA (color filter on array) substrate, but the disclosure is not limited. In addition, the polarizer 113 is disposed on one side of the first substrate 111 away from the second substrate 112, the polarizer 114 is disposed on one side of the second substrate 112 away from the first substrate 111.

The first frame 12 is disposed corresponding to the display panel 11. In this embodiment, the first frame 12 is a supporting component, and the display panel 11, the second frame 13, the adhesive element 14, the light guiding element 15, the reflective element 16 and the optical film 17 are disposed on the first frame 12. The first frame 12 has a bottom portion 121 and a side wall 122. The bottom portion 121 is connected to the side wall 122. Herein, the side wall 122 can be a continuous structure or be a discontinuous structure disposed around the bottom portion 121. In this embodiment, the side wall 122 is, for example, a continuous structure disposed around the bottom portion 121. The first frame 12 can be integrally disposed as one piece or be disposed by assembling some components of different materials. In this embodiment, the first frame 12 is integrally disposed as one piece. In some embodiments, the bottom portion 121 of the first frame 12 has a thickness C along the third direction D3, and the thickness C is defined as the minimum thickness of the bottom portion 121 of the first frame 12 along the third direction D3. The third direction D3 is the normal direction of the display panel 11. In some embodiments, the thickness C is 0.1 mm to 0.4 mm (0.1 mm≤C≤0.4 mm). In some embodiments, the thickness C of the bottom portion 121 of the first frame 12 is 0.15 mm to 0.3 mm (0.15 mm≤C≤0.3 mm), such as 0.2 mm.

The second frame 13 is disposed on the first frame 12, the display panel 11 is at least partially disposed on the second frame 13. Thus, the second frame 13 can support the display panel 11. In this embodiment, the second frame 13 may include a main body portion 131, an extension portion 132 and a protrusion portion 133. The main body portion 131 may be disposed on the first frame 12 and the main body portion 131 connected to the extension portion 132 and the protrusion portion 133. The extension portion 132 may be configured to support the display panel 11, another adhesive element 19 (e.g. an edge bonding adhesive sheet) can be provided to stick the display panel 11 on the extension portion 132 of the second frame 13. In some embodiments, the second frame 13 does not include the protrusion portion 133. In some embodiments, the width A of the main body portion 131 along the first direction D1 is between 0.2 mm and 1.0 mm (0.2 mm≤A≤1.0 mm), such as 0.6 mm or 0.35 mm. The width A can be defined as the maximum width of the main body portion 131 along the first direction D1.

The material of the first frame 12 or the material of the second frame 13 can include metal, plastics or a combination thereof, but the disclosure is not limited. The first frame 12 and the second frame 13 can include the same or different materials. Herein, the metal of the first frame 12 (or the second frame 13) can include aluminum, stainless steel or galvanized steel, other composite material or alloy, and the disclosure is not limited. In this disclosure, the first frame 12 may include a material that can easily dissipate heat. The plastics of the first frame 12 (or the second frame 13) can include polycarbonate (PC), acrylonitrile butadiene styrene (ABS), or the likes, and this disclosure is not limited. The second frame 13 may include a material that has a supporting property. The first frame 12 may be a back plate made of metal material, the second frame 13 may be a sealant, the disclosure is not limited.

The adhesive element 14 may be disposed between the first frame 12 and the second frame 13, the adhesive element 14 contacts at least a part of the bottom portion 121 of the first frame 12 and at least a part of the side wall 122 of the first frame 12. For example, the main body portion 131 has a first surface S1 and a second surface S2, the first surface S1 is adjacent to the bottom portion 121, the second surface S2 is adjacent to the side wall 122. In this case, the adhesive element 14 contacts at least a part of the first surface S1 and at least a part of the second surface S2. In addition, the protrusion portion 133 may be an extension part of the main body portion 131 corresponding to the side wall 122. The protrusion portion 133 has a fourth surface S4, the fourth surface S4 is connected to the second surface S2. In some embodiments, the adhesive element 14 can further contact at least a part of the fourth surface S4.

The adhesive element 14 can be a hot-melt adhesive or a compound having a base material of polyurethane (PU), the disclosure is not limited. In some embodiments, the material of the adhesive element 14 can include a light curing glue (e.g. UV glue), an epoxy glue, acrylic glue, or the likes, but the disclosure is not limited, the adhesive element 14 can provide the desired adhesive function. In this embodiment, the material of the adhesive element 14 may be a fluid glue that can be disposed on or around the junction between the bottom portion 121 and the side wall 122 by a dispenser. After the material of the adhesive element 14 is cured or solidified, the adhesive element 14 connects the first frame 12 and the second frame 13.

The light guiding element 15 is disposed on the bottom portion 121 of the first frame 12. The light guiding element 15 is configured to guide the transmission direction of light. Since the light guiding element 15 can provide a total reflection to the light entering the light guiding element 15, the light can be guided and outputted through the top surface of the light guiding element 15. In this embodiment, the light guiding element 15 can include a transparent material such as acrylic resin, polycarbonate, polyethylene or glass, the disclosure is not limited. In addition, the cross-section of the light guiding element 15 can be a plate shape or a wedge shape, the disclosure is not limited.

The reflective element 16 is disposed between the light guiding element 15 and the bottom portion 121 of the first frame 12. The reflective element 16 can reflect the light outputted from the bottom surface of the light guiding element 15 back the internal space of the light guiding element 15, thereby increasing the light output efficiency. The optical film 17 is disposed on the light guiding element 15 and located between the display panel 11 and the light guiding element 15. In this embodiment, four optical films 17 may be provided, four optical films 17 are stacked on each other. For example, the optical films 17 can be diffusers, a 90° collector, a 0° collector, a brightness enhancement film, or other optical films, but the disclosure is not limited. The optical films 17 can transform the light outputted from the light guiding element 15 into a uniform surface light source. In this embodiment, the backlight module is a side-type backlight module, the disclosure is not limited thereto. In other embodiments, the backlight module can be a direct-type backlight module.

In order to reduce the light leakage of the display device 1, the display device 1 of this embodiment further includes a shielding adhesive element 18 disposed on the peripheries of the display panel 11, the first frame 12 and the second frame 13. In this embodiment, the shielding adhesive element 18 is, for example, a bezel tape, which may contact the polarizer 114 or the second substrate 112 and extend to cover a part of the surfaces of the first frame 12 and the second frame 13. This configuration can reduce the light leakage from the edge of the display device 1 and further enhance the structural strength of the display device 1.

As mentioned above, in the display device 1, the second frame 13 is disposed on the first frame 12, the second frame 13 can support the display panel 11. The adhesive element 14 is disposed between the first frame 12 and the second frame 13. The adhesive element 14 contacts at least a part of the bottom portion 121 of the first frame 12 and at least a part of the side wall 122 of the first frame 12. This structural design can increase the adhesion area between the adhesive element 14 and the first frame 12. In addition, the display device 1 can be manufactured by the automatic dispensing process (replacing the manual tape dispensing process). Herein, the automatic dispensing apparatus is optionally selected according to different adhesive materials. For example, the automatic dispensing apparatus can be a dispenser, a dispensing jet, or any of other machines for applying the adhesive material. Accordingly, the adhesive material can be disposed on at least a part surface of the bottom portion 121 of the first frame 12 or at least a part surface of the side wall 122 of the first frame 12. After the second frame 13 is disposed on the first frame 12 and the adhesive material is solidified, a layer of adhesive element 14 is disposed for bonding (or adhering) the second frame 13 to the bottom portion 121 of the first frame 12 and the side wall 122 of the first frame 12. Accordingly, the adhesion area between the adhesive element 14 and the first frame 12 can be increased so as to achieve a stronger structural strength of the display device 1. Besides, this configuration is benefit to the application of narrow border automatic production so as to enhance the production yield or to increase the product competitiveness.

In order to increase the volume of the adhesive element 14 for enhancing the structural strength of the display device, in some embodiments, the second frame 13 can have different shapes. For example, the main body portion 131 of the second frame 13 has at least one notch N. In this embodiment, the notch N may be a recessed area of the junction of the extensions of the first surface S1 and the second surface S2. Accordingly, the notch N is defined by the main body portion 131 and the junction of the extensions of the first surface S1 and the second surface S2, the defined area may be a missing part of the main body portion 131. Since the main body portion 131 is configured with a notch N, the volume of the adhesive element 14 disposed between the first frame 12 and the second frame 13 can be increased, thereby enhancing the structural strength of the display device. This feature will be described in the following embodiments.

FIGS. 2A to 2F are schematic diagrams showing the display devices 1a to 1f of different aspects of this disclosure.

In the display device 1 of FIG. 1, a portion of the main body portion 131 of the second frame 13 facing the bottom portion 121 and the side wall 122 of the first frame 12 may be a right angle structure. In more specific, the main body portion 131 of FIG. 1 is not configured with the above-mentioned notch N, the first surface S1 of the main body portion 131 and the second surface S2 of the main body portion 131 are directly connected to each other.

Figure 2A:
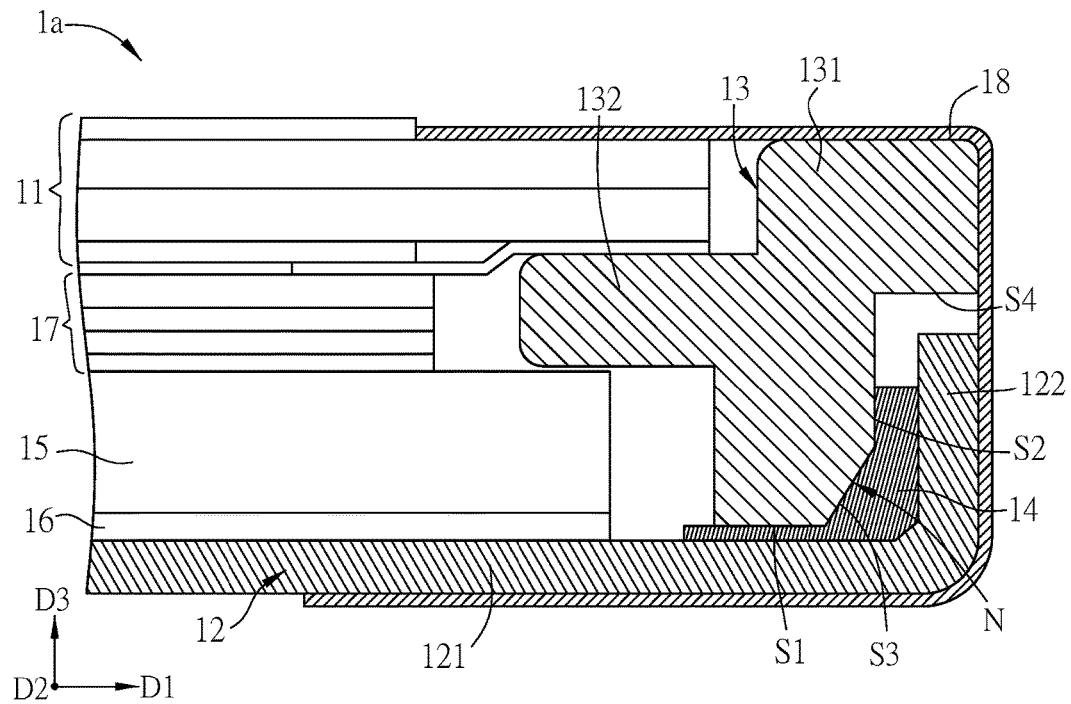
FIGS. 2A to 2F and FIGS. 3A to 3F are schematic diagrams showing the display devices of different aspects of this disclosure.

Different from the main body portion 131 of the display device 1 of FIG. 1, as shown in FIG. 2A, the notch N of the second frame 13 of the display device 1a has a bevel shape, the main body portion 131 has a third surface S3 at the notch N. The third surface S3 connects to one of the first surface S1 and the second surface S2. In more specific, a notch N is disposed between the first surface S1 and the second surface S2, and the notch N has a bevel shape. The third surface S3 faces (or is adjacent to) the bottom portion 121 and the side wall 122. The adhesive element 14 can contact at least a part of the first surface S1, the second surface S2 and the third surface S3. Of course, in other embodiments, the adhesive element 14 can further contact at least a part of the fourth surface S4.

Figure 2B:
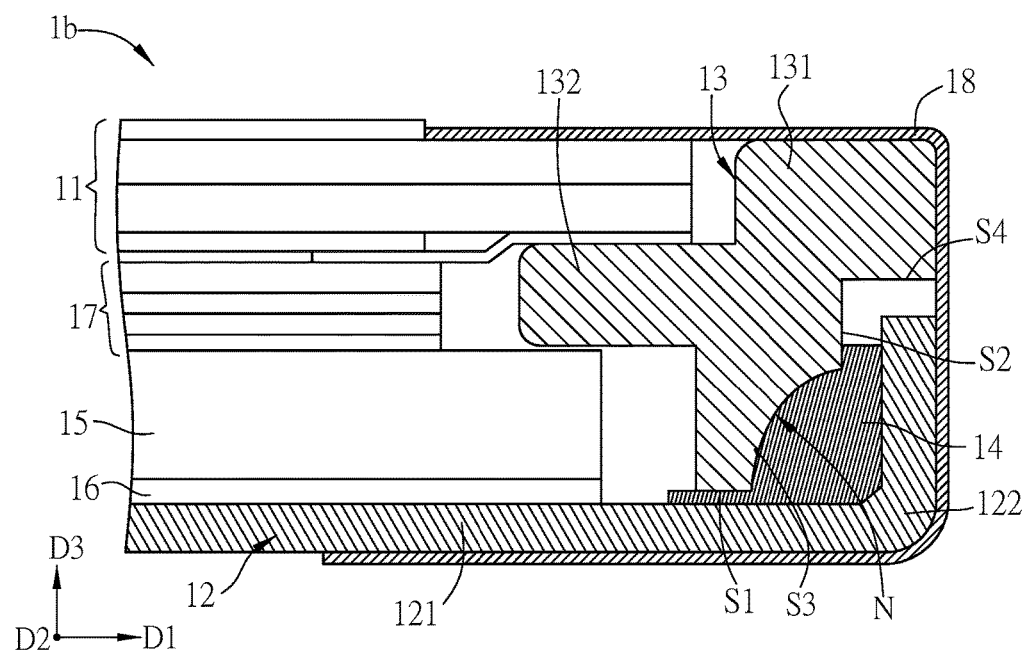

In addition, as shown in FIG. 2B, the notch N of the second frame 13 of the display device 1b has an arc shape. In more specific, a notch N is disposed between the first surface S1 and the second surface S2, the notch N has an arc shape. The third surface S3 faces (or is adjacent to) the bottom portion 121 and the side wall 122. The third surface S3 is a concave arc surface. The third surface S3 is connected between the first surface S1 and the second surface S2. The adhesive element 14 can contact at least a part of the third surface S3 or contact the entire third surface S3.

Figure 2C:
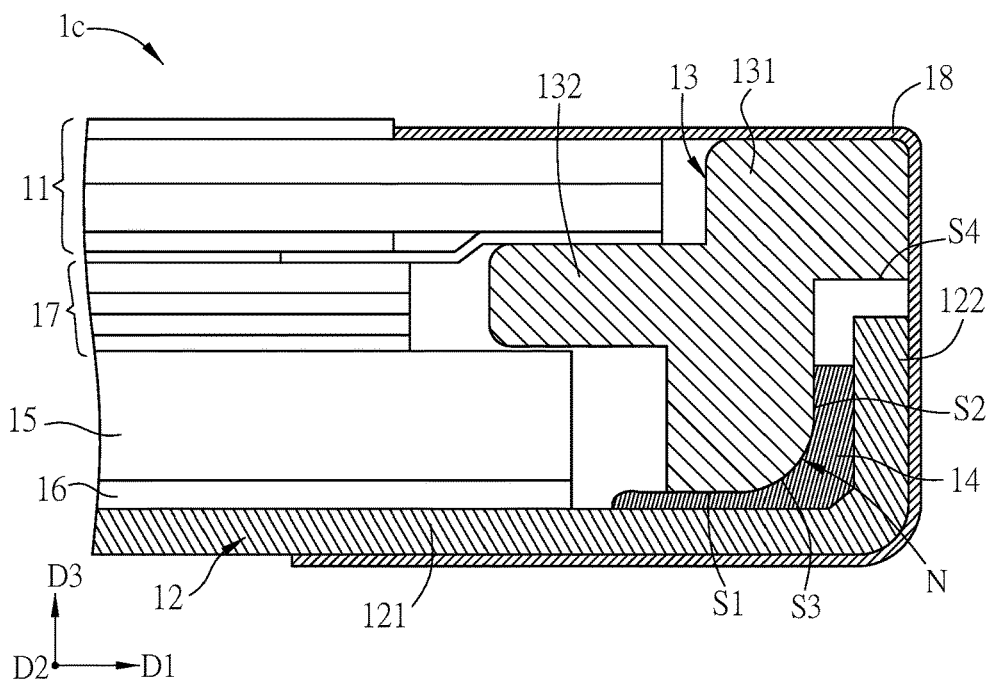

Different from the notch N of the second frame 13 of the display device 1b of FIG. 2B, as shown in FIG. 2C, the notch N of the second frame 13 of the display device 1c has an inverted arc shape. In more specific, a notch N is disposed between the first surface S1 and the second surface S2, the notch N has an inverted arc shape. The third surface S3 faces (or is adjacent to) the bottom portion 121 and the side wall 122. The third surface S3 is a convex arc surface. The third surface S3 is connected between the first surface S1 and the second surface S2. The adhesive element 14 can contact at least a part of the third surface S3 or contact the entire third surface S3.

Figure 2D:
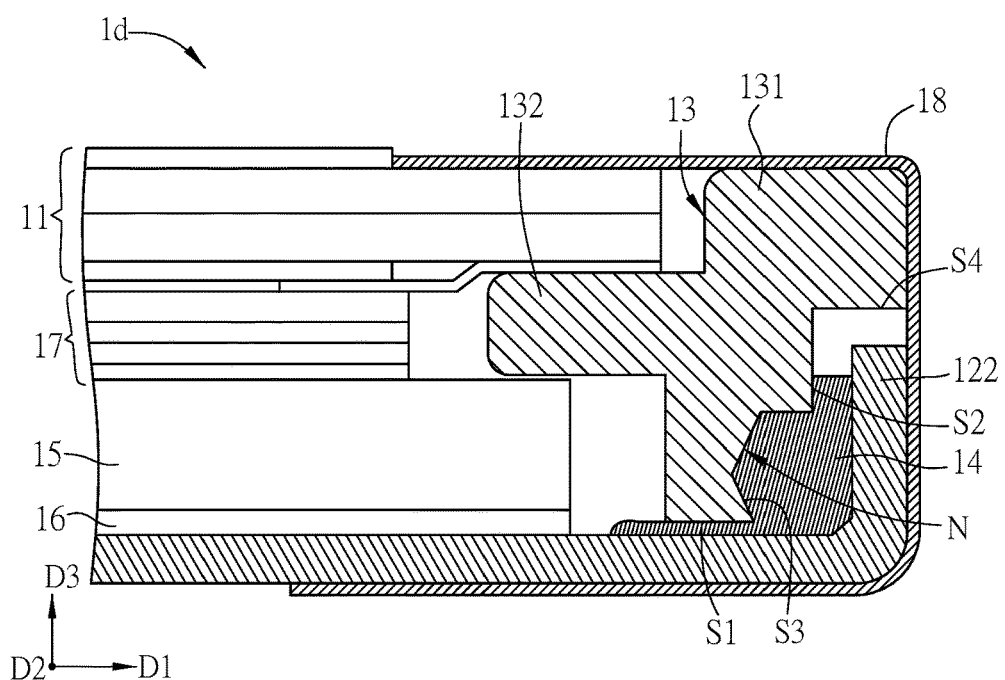

In addition, as shown in FIG. 2D, the notch N of the second frame 13 of the display device 1d has a polygonal structure. A notch N is disposed between the first surface S1 and the second surface S2, and the notch N has a polygonal structure. The third surface S3 faces (or is adjacent to) the bottom portion 121 and the side wall 122. The third surface S3 includes three continuous surfaces. The third surface S3 is connected between the first surface S1 and the second surface S2. The adhesive element 14 can contact at least a part of the third surface S3 or contact the entire third surface S3.

Figure 2E:
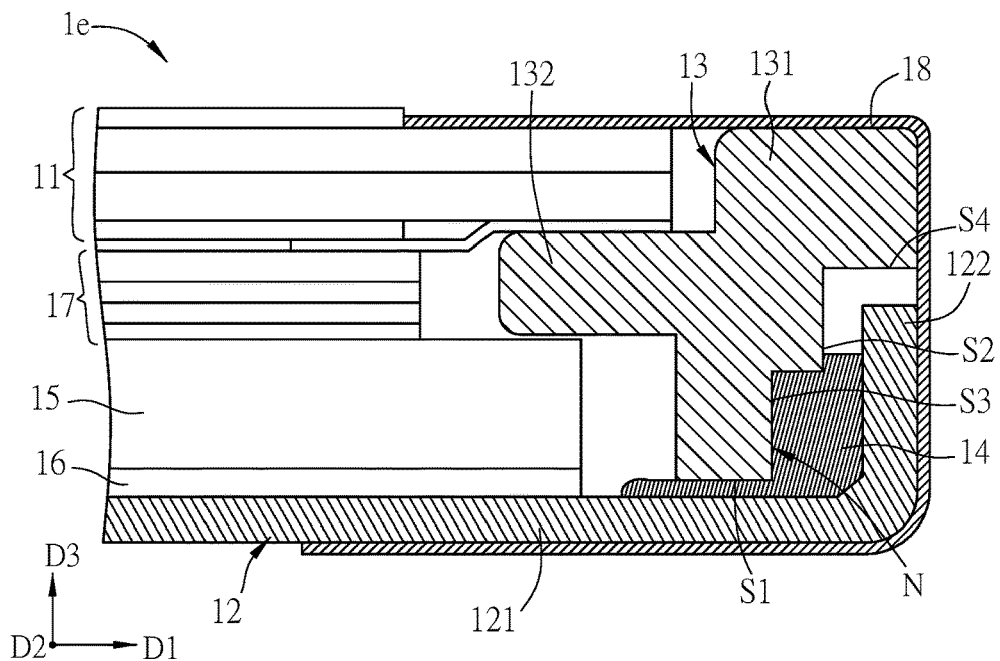

In addition, as shown in FIG. 2E, the notch N of the second frame 13 of the display device 1e has a polygonal structure. A notch N is disposed between the first surface S1 and the second surface S2, and the notch N has a rectangular shape. The third surface S3 faces (or is adjacent to) the bottom portion 121 and the side wall 122. The third surface S3 includes two continuous surfaces. The third surface S3 is connected between the first surface S1 and the second surface S2. The adhesive element 14 can contact at least a part of the third surface S3 or contact the entire third surface S3.

Figure 2F:
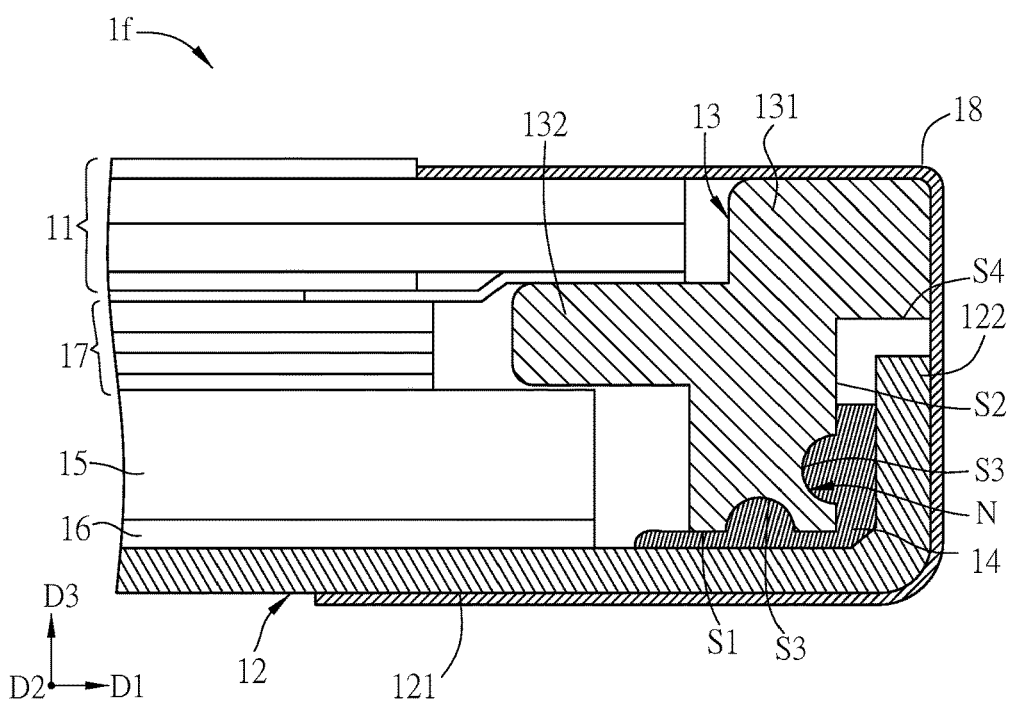

In addition, as shown in FIG. 2F, the notch N of the second frame 13 of the display device if includes two semicircles. In more specific, the first surface S1 and the second surface S2 respectively has a notch N, the notches N has a semicircle shape. A notch N is disposed on the first surface S1, the other notch N is disposed on the second surface S2. The notches N (two notches N) respectively has a concave surface corresponding to the bottom portion 121 or the side wall 122. The two concave surfaces and a connecting surface around the junction of the first surface S1 and the second surface S2 form a third surface S3. In other words, the third surface S3 includes two concave surfaces and the connecting surface, the third surface S3 is adjacent to the bottom portion 121 and the side wall 122 of the first surface 12. In addition, the adhesive element 14 can contact at least a part of the third surface S3 of the notches N or contact the entire third surface S3 of the notches N.

In the aspects shown in FIGS. 2A to 2F, the main body portion 131 can have a notch N disposed around the junction between the first surface S1 and the second surface S2, the notch N can have a bevel shape, an arc shape, an inverted arc shape, a polygonal structure, or a combination thereof, but the disclosure is not limited. In addition, the main body portion 131 can have a notch disposed on the first surface S1 or the second surface S2, the notch can have a semicircle shape, a rhombus shape, a triangle shape, a polygonal structure, or any of other suitable shapes, but the disclosure is not limited. Moreover, the second frame 13 can have a plurality of notches N, the disclosure is not limited. Of course, the above-mentioned aspects of the notches can be combined based on the requirements.

In addition, the other technical contents of the display devices 1a to 1f can be referred to the same components of the display device 1, so the detailed descriptions thereof will be omitted. The shapes of the second frames 13 of the display devices 1a to 1f are for illustrations and are not to limit this disclosure.

FIGS. 3A to 3H are schematic diagrams showing the display devices 1g to 1m of different aspects of this disclosure.

Figure 3A:
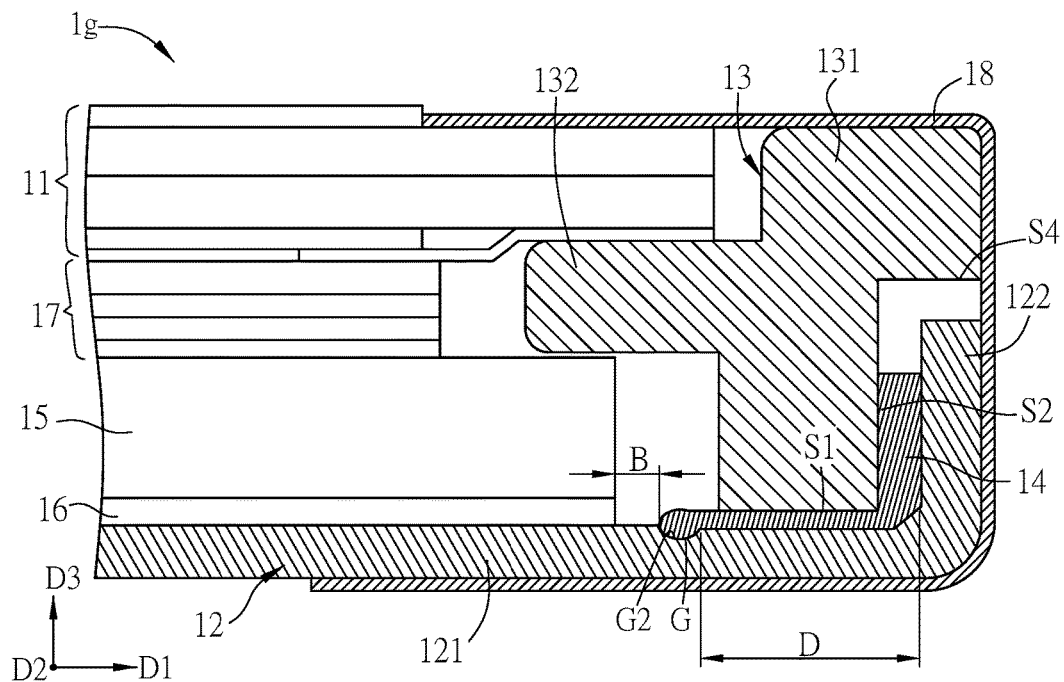

Different from the display device 1 of FIG. 1, as shown in FIG. 3A, the bottom portion 121 of the first frame 12 of the display device 1g includes at least one groove G, groove G is located portion between the side wall 122 and the light guiding element 15 (or the reflective element 16), the light guiding element 15 and the groove G are separated by a distance. In this embodiment, the bottom portion 121 is configured with one groove the groove G has an arc shape. The purpose for configuring the groove G on the bottom portion 121 of the first frame 12 is to provide a structure for receiving the overflowed adhesive. In practice, when disposing the fluid adhesive on the bottom portion 121 and the side wall 122, the groove G can reduce the overflowed adhesive (e.g. the adhesive element 14) to contact the light guiding element 15 or the reflective element 16, thereby reducing the opportunity of the light guiding element 15 (or the reflective element 16) is affected. When the first frame 12 include metal material, the groove G can be disposed by stamping. When the first frame 12 include plastic material, the groove G can be disposed by ejection molding, but the disclosure is not limited. In addition, the groove G has an internal wall G2, the internal wall G2 is the internal surface of a concave portion of the groove G (with respect to the surface of the bottom portion 121). The adhesive element 14 can contact at least a part of the internal wall G2.

In this embodiment, for example, the adhesive element 14 contacts the entire internal wall G2 of the groove G. In some embodiments, the adhesive element 14 may not contact the internal wall G2 of the groove G or contact a part of the internal wall G2 of the groove G. In this embodiment, the first surface S1 of the second frame 13 and the groove G do not have any overlapped portion in the third direction D3. In some embodiments, a distance D between the groove G and the side wall 122 of the first frame 12 along the first direction D1 is greater than or equal to 1.0 mm (D 1 mm). The distance D can be defined as the shortest distance between the groove G and the side wall 122 of the first frame 12 along the first direction D1. The first direction D1 is defined as a direction perpendicular to an extending direction of the main body portion 131. In some embodiments, a distance B between the groove G and the light guiding element 15 (or the reflective element 16) along the first direction D1 can be 0.7 mm to 1.2 mm (0.7 mm≤B≤1.2 mm). Moreover, the distance B can be 0.7 mm to 0.9 mm (0.7 mm≤B≤0.9 mm). The distance B can be defined as the shortest distance between the groove G and the light guiding element 15 (or the reflective element 16) along the first direction D1. The purpose for providing the distance B is to prepare a space for the thermal expansion of light guiding element 15 (or the reflective element 16), so that the adhesive material can be remained in the groove G or will not contact the light guiding element 15 (or the reflective element 16). In some embodiments, a width (not shown) of the groove G along the first direction D1 is, for example, 0.2 mm, a depth of the groove G along the third direction D3 is, for example, 0.01 mm to 0.05 mm (0.01 mm≤the depth of the groove G≤0.05 mm). In some embodiments, the depth of the groove G can be 0.02 mm to 0.045 mm (0.02 mm≤the depth of the groove G≤0.045 mm). In some embodiments, For example, the depth of the groove G is 0.03 mm.

Figure 3B:
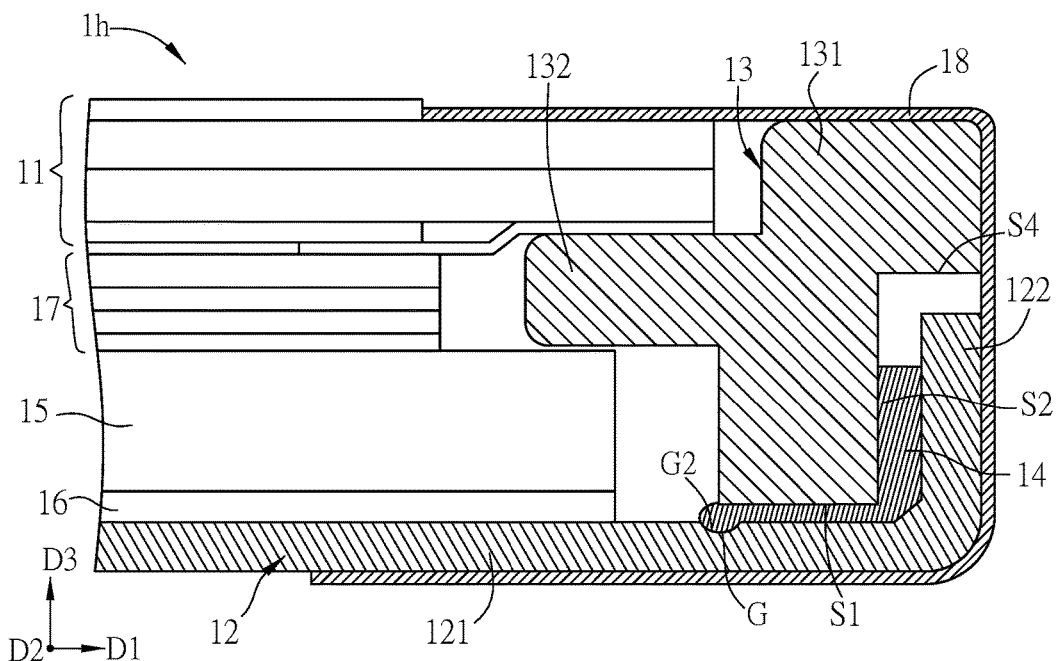

Different from the display device 1g of FIG. 3A, as shown in FIG. 3B, at least a part of the groove G of the display device 1h is overlapped with the first surface S1 of the second frame 13 along the third direction D3. The third direction D3 is defined as a normal direction of the display panel 11. In other words, a part of the first surface S1 of the second frame 13 is disposed over the groove G. In this embodiment, the adhesive element 14 contacts a part of the internal wall G2.

To be noted, the terms "equal to" or "the same as" should be understood that an error (about 10%) can be existed. For example, when defining the distance D is equal to 1.0 mm, it is acceptable that the distance D is between 0.9 mm and 1.1 mm.

Figure 3C:
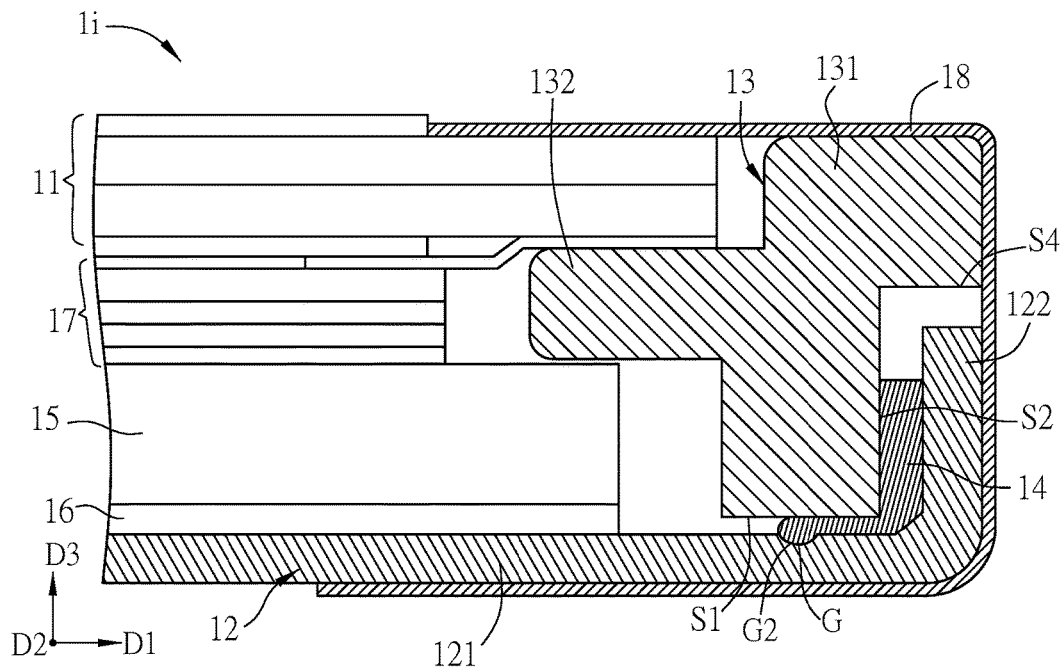

Different from the display device 1h of FIG. 3B, as shown in FIG. 3C, the groove G of the display device 1i is overlapped with the first surface S1 of the second frame 13 along the third direction D3. In other words, the entire groove G is relatively disposed underneath the first surface S1 of the second frame 13. In this embodiment, the adhesive element 14 contacts a part of the internal wall G2.

Figure 3D:
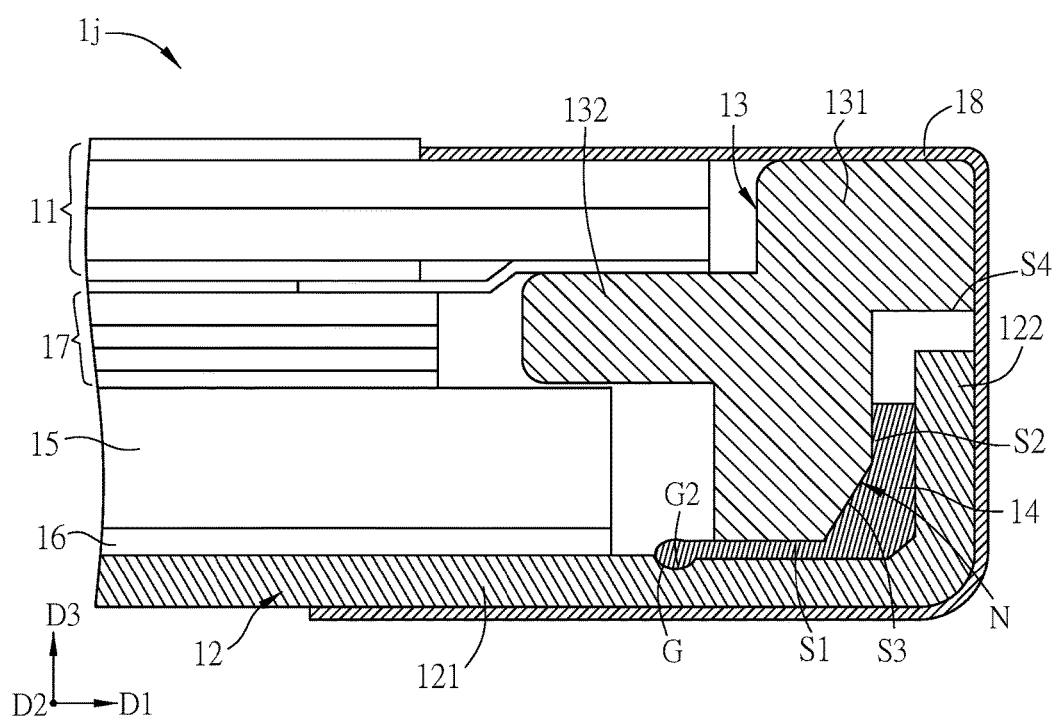

The design of the above-mentioned groove G can also be applied to the aspects of FIGS. 2A to 2F. For example, as shown in FIG. 3D, the display device 1j includes a groove G applied to the bottom portion 121 of the first frame 12 in the display device 1a of FIG. 2A. Of course, the groove G of the bottom portion 121 of the first frame 12 can also be applied to the display devices 1b to 1f of FIGS. 2B to 2F, or the configuration position of the groove G of the FIG. 3B or 3C can be applied to the aspects of FIGS. 2A to 2F. In addition, the groove G and the notch N of the main body portion 131 can be applied in a suitable way or any combination based on the requirements of products.

In other embodiments, it is also possible to configure a plurality of grooves G, and the cross-section of the groove G can be an arc shape, a sharp angle shape, a polygon, an irregular shape or a combination thereof, but the disclosure is not limited. FIGS. 4A to 4D and 5A to 5E show some aspects of the grooves G. FIGS. 4A to 4D are schematic diagrams showing the grooves G of different aspects of this disclosure, and FIGS. 5A to 5E are schematic diagrams showing the first frames 12 and the corresponding grooves G of different aspects of this disclosure.

Figure 4A:
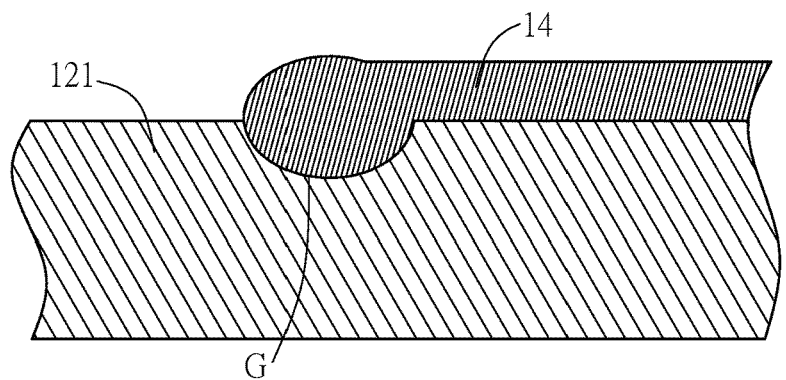
FIGS. 4A to 4D are schematic diagrams showing the grooves of different aspects of this disclosure.
Figure 4B:
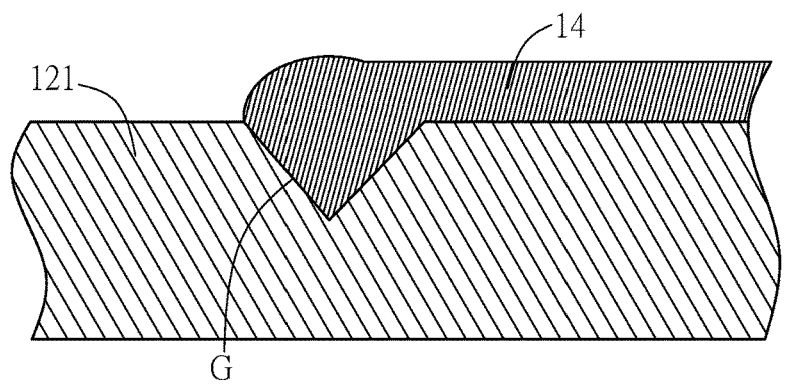
Figure 4C:
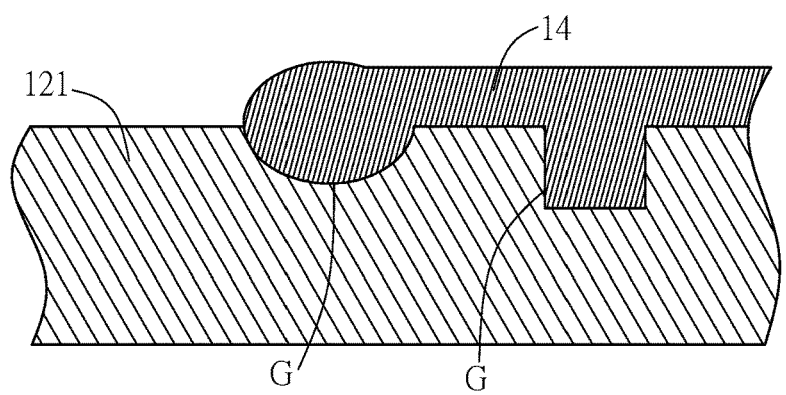
Figure 4D:
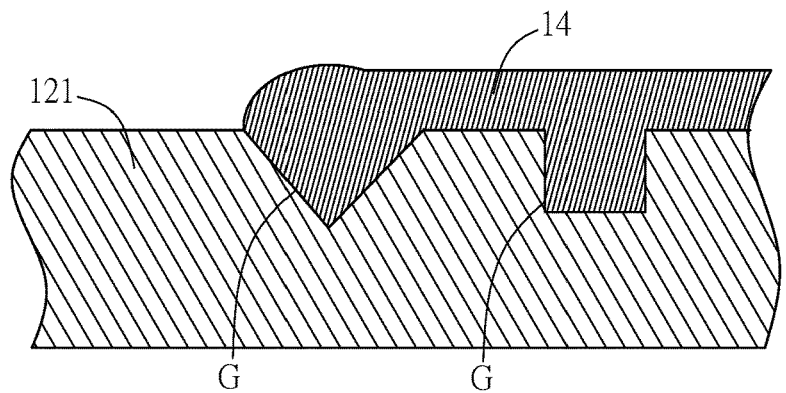

As shown in FIG. 4A, the cross-section of the groove G is an arc shape. As shown in FIG. 4B, the cross-section of the groove G is a sharp angle shape. As shown in FIG. 4C, two grooves G are configured, the cross-sections of the two grooves G are an arc shape and a polygon. As shown in FIG. 4D, two grooves G are configured, the cross-sections of the two grooves G are a sharp angle shape and a polygon. To be noted, this disclosure is not limited to the above aspects, the configurations of the grooves G can have any combination of the above features according to the requirements of products.

Figure 5A:
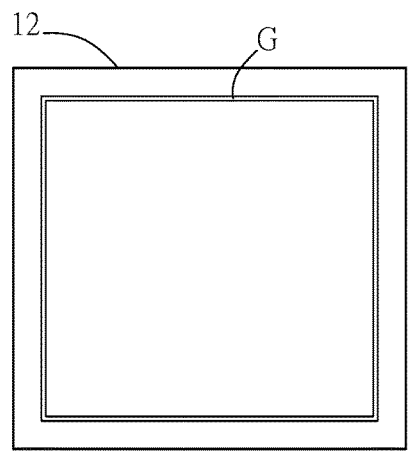
FIGS. 5A to 5E are schematic diagrams showing the first frames and the corresponding grooves of different aspects of this disclosure.
Figure 5B:
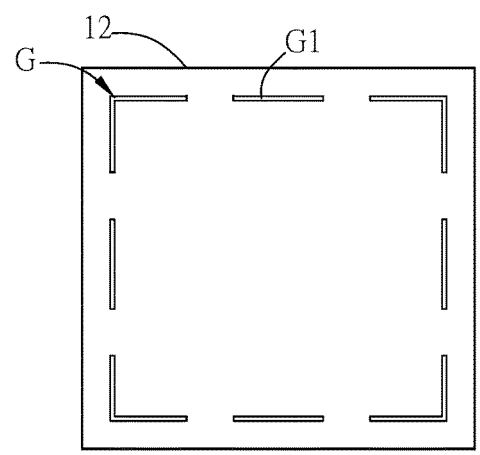
Figure 5C:
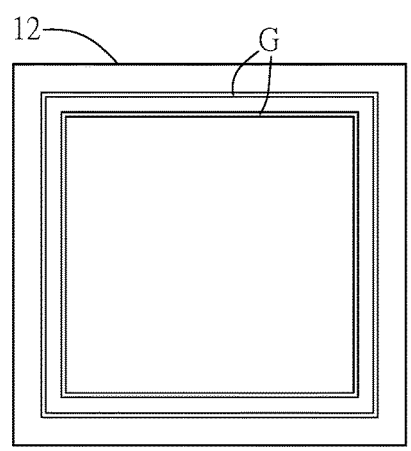
Figure 5D:
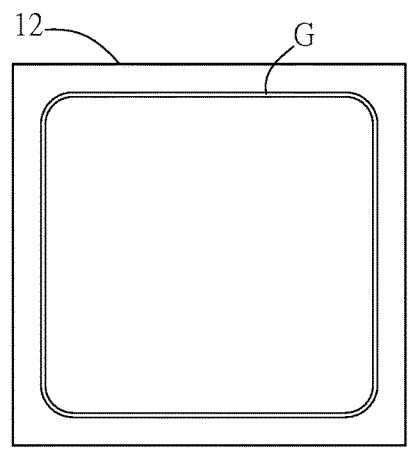
Figure 5E:
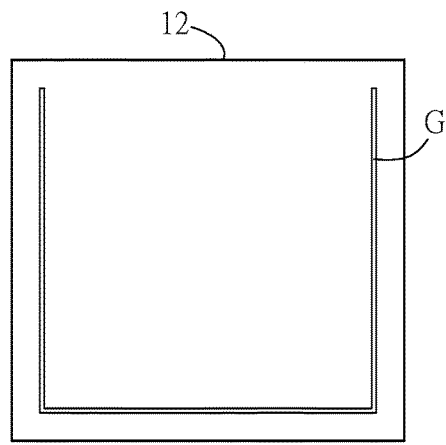

In some embodiments, the groove G is an annular groove viewed from a normal direction of the display panel 11. In other embodiments, the groove G is a patterned groove, which includes a plurality of groove sections G1 viewed from the normal direction of the display panel 11. For example, as shown in FIG. 5A, the groove G is a quadrilateral annular groove. As shown in FIG. 5B, the groove G is a patterned quadrilateral groove having a plurality of groove sections G1. As shown in FIG. 5C, the groove G includes two quadrilateral annular grooves. As shown in FIG. 5D, the groove G is a quadrilateral annular groove with round corners viewed from the normal direction of the display panel 11. As shown in FIG. 5E, three sides of the first frame 12 are configured with grooves the residual side of the first frame 12 is not configured with any groove but is configured with an edge-type light source (not shown). Of course, this disclosure is not limited to the aspect of the side-type light source. For example, the configured light source can also be a direct-type light source (not shown). To be noted, the shapes and amount of the grooves G in the above aspects are for illustrations and are not to limit this disclosure.

Figure 3E:
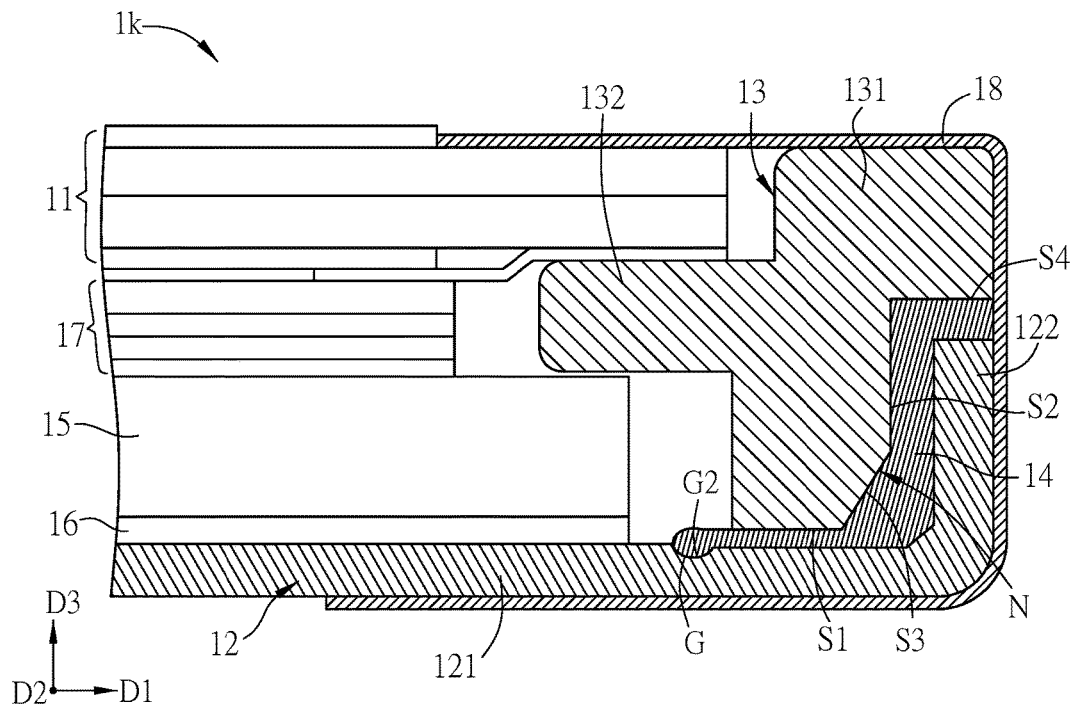

Different from the display device 1*j* of FIG. 3D, as shown in FIG. 3E, the adhesive element 14 of the display device 1*k* contacts the first surface S1 and the third surface S3 of the second frame 13, and further fills the distance Between the side wall 122 and the second frame 13 so as to contact the entire second surface S2 and the entire fourth surface S4. This configuration can further increase the adhesion strength between the first frame 12 and the second frame 13. Of course, the adhesive element 14 can fill the distance between the side wall 122 and the second frame 13 so as to contact most part or all of the second surface S2 and a part of the fourth surface S4, the disclosure is not limited.

Figure 3F:
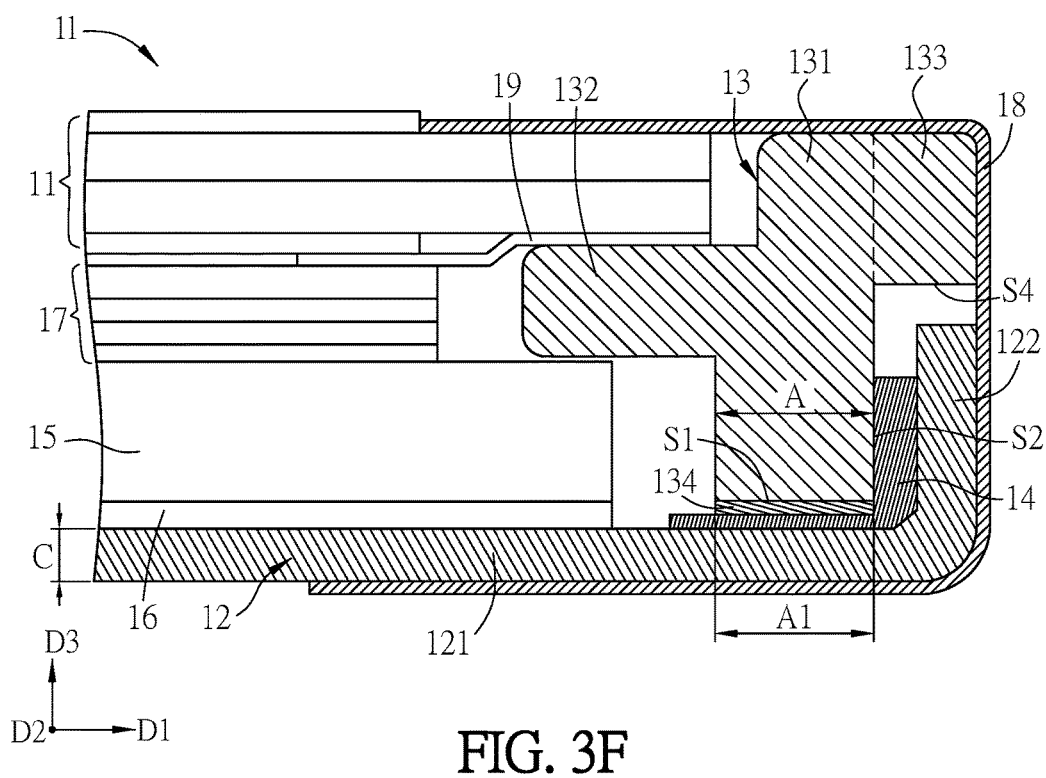
Figure 3G:
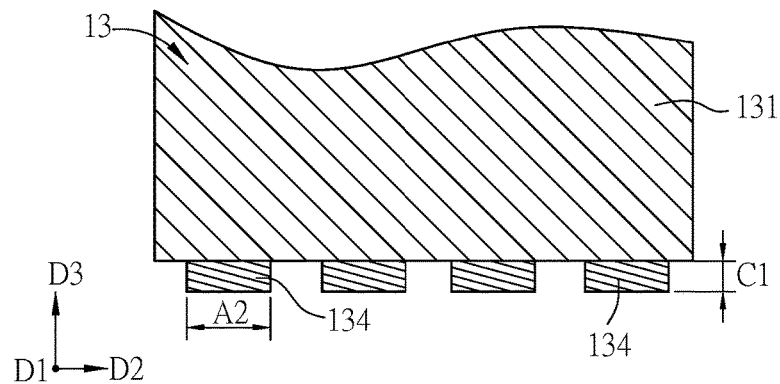
FIG. 3G is a schematic diagram showing a part of the second frame of FIG. 3F.

Referring to FIG. 3F in view of FIG. 3G in the display device 1*l*, the second frame 13 further includes a plurality of protrusion portions 134, the protrusion portions 134 connect to the first surface S1 of the main body portion 131. The protrusion portions 134 can be separately disposed along an extending direction of the main body portion 131 (the second direction D2), and the protrusion portions 134 are adjacent to the bottom portion 121. The protrusion portions 134 and the main body portion 131 can be integrally disposed as one piece, the protrusion portions 134 and the main body portion 131 can include different materials, but the disclosure is not limited. The protrusion portions 134 are configured to increase the height, so that a sufficient space can be maintained between the first frame 12 and the second frame 13 for accommodating the light guiding element 15 or the reflective element 16. In addition, the configuration of the protrusion portions 134 can increase the contact area between the adhesive element 14 and the second frame 13, thereby increasing the structural strength. The adhesive element 14 can be disposed on the intervals between the protrusion portions 134, or the adhesive element 14 can be disposed between at least one of the protrusion portions 134 and the bottom portion 121. Moreover, the protrusion portions 134 have a width A1 along the first direction D1 (the first direction D1 is defined as a direction perpendicular to the extending direction of the main body portion), and the width A1 can be equal to the width A of the main body portion 131 along the first direction D1. To be noted, the part of the second frame 131 corresponding to the light input surface is not configured with the protrusion portions 134, the part of the second frame 131 corresponding to the light output surface may be configured with three protrusion portions 134. Besides, the parts of the second frame 131 not corresponding to the light input surface and the light output surface are configured with four protrusion portions 134. The configuration of the protrusion portions 134 can have any combination of the above aspects according to the requirements of products.

As shown in FIG. 3G the thickness C1 of the protrusion portions 134 along the third direction D3 (the normal direction of the display panel 11) can be 0.08 mm, the width A2 of each protrusion portion 134 along the second direction D2 can be 1 mm, but the disclosure is not limited. The feature of this embodiment that the second frame 13 includes a plurality of protrusion portions 134 as mentioned above can also be applied to the embodiments of FIGS. 1, 2A to 2F and 3A to 3E, and this disclosure is not limited.

Figure 3H:
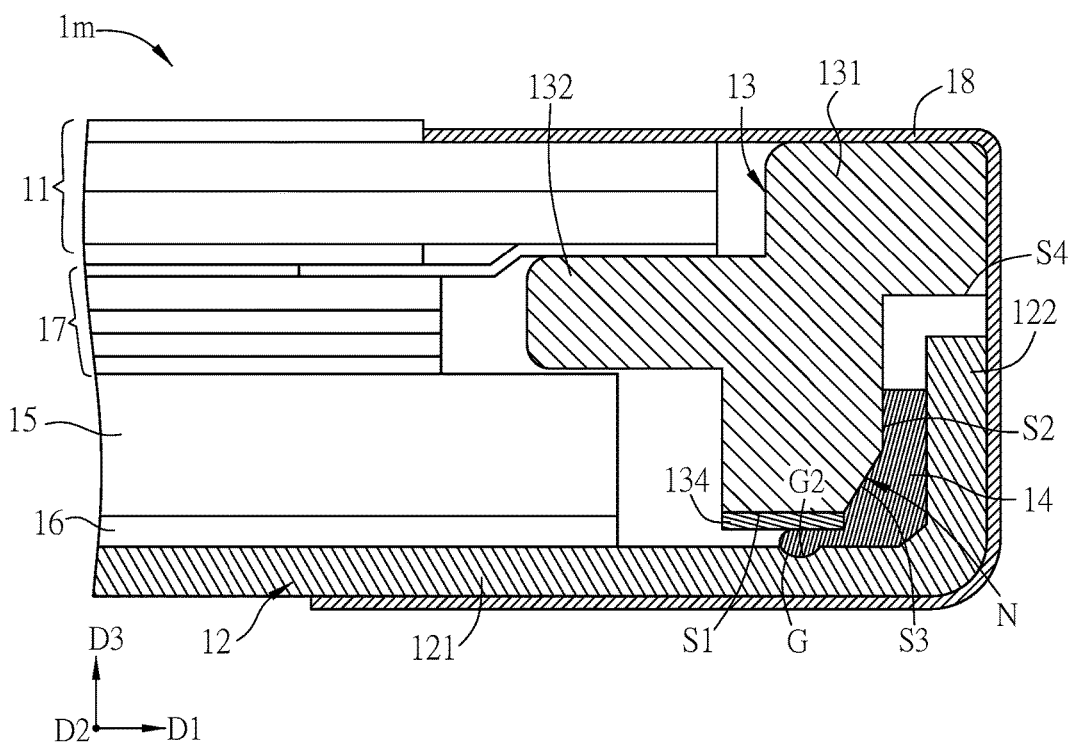
FIG. 3H is a schematic diagram showing the display device of another aspect of this disclosure.

As shown in FIG. 3H, the second frame 13 of the display device 1*m* has a notch N, the notch N is located close to the bottom portion 121 or the side wall 122 of the first frame 12, the adhesive element 14 contacts the first surface S1, the third surface S3 with the notch N, and a part of the second surface S2. In addition, the groove G and the first surface S1 of the second frame 13 are overlapped along the third direction D3. In the display device 1*m*, the second frame 13 further includes a plurality of protrusion portions 134, which are separated structures disposed on the main body portion 131 and located corresponding to the bottom portion 121 of the first frame 12. The width of the protrusion portions 134 along the first direction D1 is equal to the width of the first surface S1 of the main body portion 131 of the second frame 13 along the first direction D1.

The other technical features of the display devices 1*g* to 1*m* can be referred to the same components of the display device 1, so the detailed descriptions thereof will be omitted.

Figure 6:
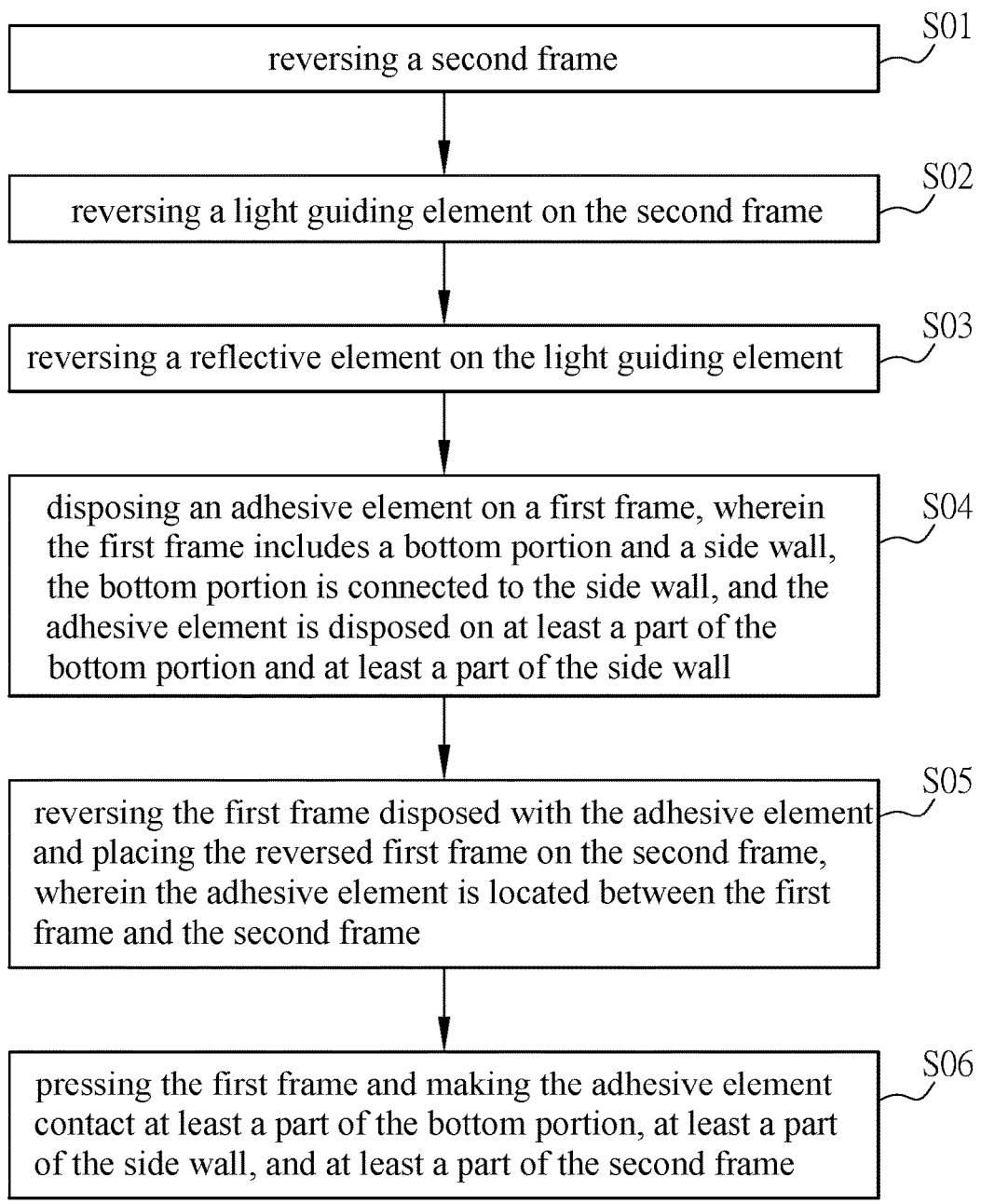
FIG. 6 is a flow chart of an assembling method of a display device according to an embodiment of this disclosure.
Figure 7:
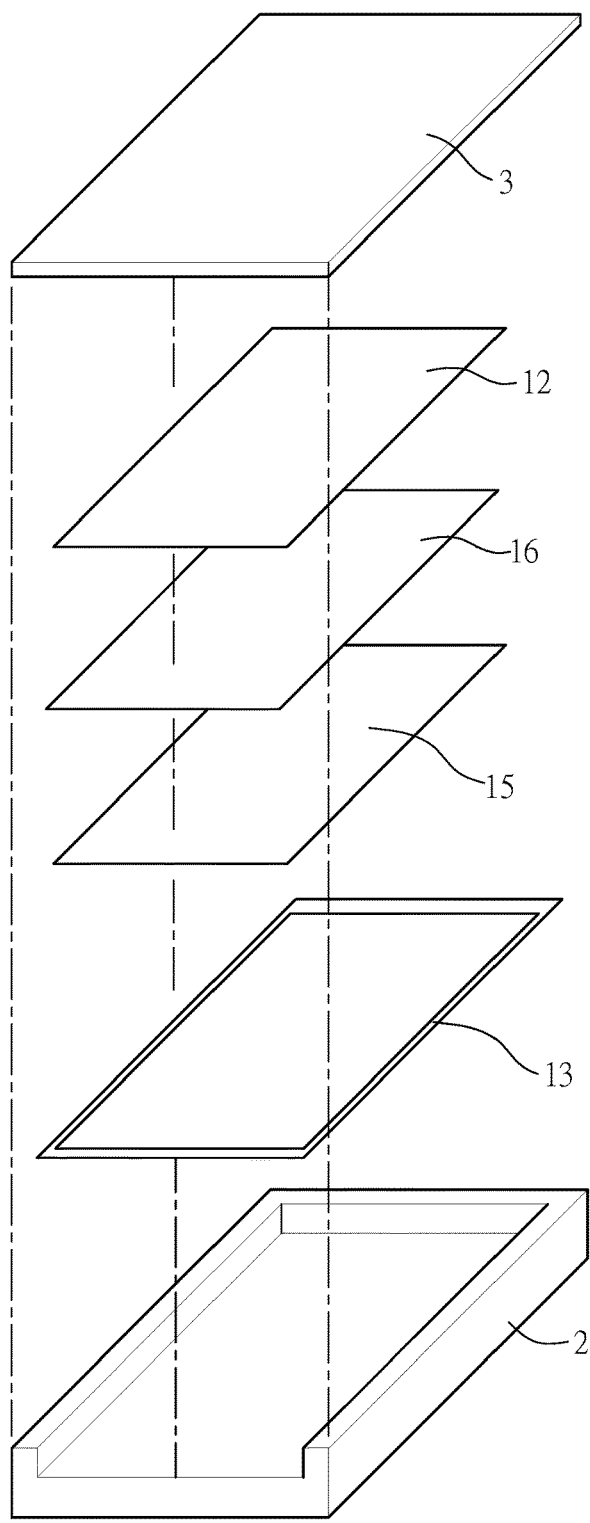
FIG. 7 is a schematic diagram showing the assembling of a display device according to an embodiment of this disclosure.

The assembling procedure of the display device will be further described with reference to FIGS. 6 and 7 in view of FIG. 1. FIG. 6 is a flow chart of an assembling method of the display device 1 according to the embodiment of this disclosure, FIG. 7 is a schematic diagram showing the assembling of the display device 1 according to the embodiment of this disclosure.

The assembling method of the display device 1 includes: reversing a second frame 13; disposing an adhesive element 14 on a first frame 12, wherein the first frame 12 includes a bottom portion 121 and a side wall 122, the bottom portion 121 is connected to the side wall 122, and the adhesive element 14 is disposed on a part of the bottom portion 121 and a part of the side wall 122; reversing the first frame 12 disposed with the adhesive element 14 and placing the reversed first frame 12 on the second frame 13, wherein the adhesive element 14 is located between the first frame 12 and the second frame 13; and pressing the first frame 12 and making the adhesive element 14 contact at least a part of the bottom portion 121 and at least a part of the side wall 122 and at least a part of the second frame 13. The step of reversing is to put the surface away from the display panel 11 upwardly. For example, the first surface S1 of the second frame 13 is usually away from the display panel 11 (facing downwardly), and to reverse the second frame 13, is to rotate the second frame 13 so the first surface S1 is facing upward.

Before the step of disposing an adhesive element 14 on the first frame 12, the assembling method further includes: turning a light guiding element 15 on the second frame 13; turning a reflective element 16 on the light guiding element 15; turning the first frame 12, the second frame 13, the reflective element 16, or the light guiding element 15, wherein the light guiding element 15 may be disposed upwardly; disposing an optical film 17 on the light guiding element 15; disposing a display panel 11 on the optical film 17, wherein the display panel 11 is supported by the second frame 13, and the display panel 11 is disposed corresponding to the first frame 12; and disposing a shielding adhesive element 18 at a periphery of the display panel 11, the first frame 12, and the second frame 13. The step of turning is to turn the reversed element back to the usual position. For example, the first surface S1 of the reversed second frame 13 is facing upward, and to turn the second frame 13, is to rotate the second frame 13 so the first surface S1 is facing downward.

The more detailed description can be referred to the steps S01 to S07 as shown in FIG. 6. In this embodiment, the reverse assembling is performed. This assembling method is benefit to the automatic manufacturing, the stacking order of the relative components can be changed or modified without departing the scope of this disclosure, the embodiment is an example and is not to limit this disclosure.

The step S01 is to reverse a second frame 13. In more specific, this embodiment is to reverse the second frame 13 for easily performing the following assembling procedures. As shown in FIG. 7, the extension portion 132 or the first surface S1 of the second frame 13, which is configured to support the display panel 11, the extension portion 132 or the first surface S1 of the second frame 13 are disposed toward a fixture 2 and disposed on the fixture 2. If the second frame 13 includes the protrusion portions 134, the protrusion portions 134 of the second frame 13 are dispose away from the fixture 2. In this step, the shape of the fixture 2 is designed corresponding to the shape of the second frame 13.

Next, the step S02 is to reverse a light guiding element 15 on the second frame 13. In some embodiments, a light emitting unit (e.g. a LED light bar (not shown)) on one side of the light guiding element 15, and then the light guiding element 15 is reversed and disposed on the second frame 13. In other words, the light output surface of the light guiding element 15 is disposed facing the second frame 13. Afterwards, the step S03 is performed to reverse a reflective element 16 on the light guiding element 15.

Then, the step S04 is to dispose an adhesive element 14 on a first frame 12, wherein the first frame 12 includes a bottom portion 121 and a side wall 122, the bottom portion 121 is connected to the side wall 122, the adhesive element 14 is disposed on at least a part of the bottom portion 121 and the side wall 122 of the first frame 12. To be noted, the step S04 can be executed by the automatic dispensing apparatus, the adhesive element 14 can be disposed on at least a part of the bottom portion 121 or the side wall 122 of the first frame 12 by a side dispensing method.

To be noted, the above embodiment is to perform the steps S01 to S03 and then perform the step S04. Alternatively, the step S04 can be performed before the steps S01 to S03, or the step S04 can be performed along with the steps S01 to S03, the disclosure is not limited. In addition, before the step S04, in some embodiments as shown in one of FIGS. 5A to 5E, the assembling method further includes the following steps of: disposing at least a groove G on the bottom portion 121 of the first frame 12. In this case, the groove G is disposed close to the side wall 122. In some embodiments, the second frame 13 further includes a main body portion 131, the main body portion 131 has a first surface S1, a second surface S2, or a third surface S3. The first surface S1 is adjacent to the bottom portion 121, and a part of the groove G is overlapped with the first surface S1 along the third direction D3. The groove G has an internal wall G2, the adhesive element 14 contacts a part of the internal wall G2. The second surface S2 is adjacent to the side wall 122, the third surface S3 connects to the first surface S1 and the second surface S2. The adhesive element 14 contact at least a part of the first surface S1, the second surface S2 and the third surface S3. In some embodiments, the second frame 13 has first surface S1 adjacent to the bottom portion 121 of the first frame 12, and at least a part of the groove G is overlapped with the first surface S1 of the second frame 13 along the third direction D3. Alternatively, the groove G can be not overlapped with the first surface S1 of the second frame 13 along the third direction D3.

Next, the step S05 is to reverse the first frame 12 disposed with the adhesive element 14 and place the reversed first frame 12 on the second frame 13, wherein the adhesive element 14 is located between the first frame 12 and the second frame 13. In the step S05, in some embodiments as shown in one of FIGS. 2A to 2F, the second frame 13 has at least one notch N, which is disposed close to the bottom portion 121 or the side wall 122 of the first frame 12. The notch N has at least a third surface S3, and the adhesive element 14 contacts at least a part of the third surface S3. The notch N can be a missing part of the main body portion 131, such as a missing structure with a bevel shape, an arc shape, an inverted arc shape, a polygonal structure, or a combination thereof. In addition, in the step S05, a reflective element 16 is disposed between the light guiding element 15 and the first frame 12, and the light guiding element 15 and the reflective element 16 are disposed between the first frame 12 and the second frame 13.

Then, the step S06 is to press the first frame 12 and make the adhesive element 14 contact at least a part of the bottom portion 121, at least a part of the side wall 122 of the first frame 12, and at least a part of the second frame 13. In more specific, the adhesive material of the adhesive element 14 is dispensed on the second frame 13, and then the first frame 12 is reversed. After applying the pressing force, heating, or UV curing, the adhesive material can be solidified to obtain the adhesive element 14, thereby bonding the first frame 12 and the second frame 13. The adhesive element 14 contacts at least a part of the bottom portion 121 and the side wall 122 of the first frame 12 and the second frame 13. As shown in FIG. 7, a pressing member 3 is provided at the rear side of the first frame 12 for pressing the first frame 12, the reflective element 16, the light guiding element 15 and the second frame 13 into the fixture 2, so that the adhesive element 14 can bond the first frame 12 to the second frame 13. In some embodiments, as shown in FIG. 1, the second frame 13 has a first surface S1, a second surface S2, and a fourth surface S4. The first surface S1 is adjacent to the bottom portion 121, and the second surface S2 is adjacent to the side wall 122. The adhesive element 14 can contact at least a part of the first surface S1 and the second surface S2, or further contact at least a part of the fourth surface S4.

To be noted, the light guiding element 15 and the reflective element 16 are assembled on the second frame 13 in order (the step S02 and step S03), and then the steps S05 and S06 are performed. In a different embodiment, the assembling steps can be changed. For example, the steps S05 and S06 can be performed for assembling the first frame 12 and the second frame 13. Then, the light guiding element 15 is disposed on the second frame 13, the reflective element 16 is disposed on the light guiding element 15, thereby disposing the light guiding element 15 and the reflective element 16 between the first frame 12 and the second frame 13. In addition, the assembling steps can further include: detaching the fixture 2 and turning the first frame 12, the reflective element 16, the light guiding element 15 and the second frame 13, wherein the light output surface of the light guiding element 15 is upward; disposing at least one optical film 17 on the light guiding element 15 (see FIG. 1); and disposing the display panel 11 on the optical film 17. In this embodiment, the display panel 11 is supported by the extension portion 132 of the second frame 13, so that the display panel 11 can be disposed corresponding to the first frame 12. Finally, a shielding adhesive element 18 is disposed on the peripheries of the display panel 11, the second frame 13 and the first frame 12. Accordingly, the assembling procedure of the display device 1 is finished.

To be noted, the above assembling method is a reverse assembling procedure. Of course, the assembling method of the display device can be a normal assembling procedure.

As shown in FIG. 1, the normal assembling procedure includes the following steps. The first step is to dispose an adhesive element 14 on a first frame 12, wherein the first frame 12 includes a bottom portion 121 and a side wall 122, the bottom portion 121 connects to the side wall 122, the adhesive element 14 is disposed on a part of the bottom portion 121 and the side wall 122 of the first frame 12. The second step is to dispose a reflective element 16 on the bottom portion 121 of the first frame 12, wherein the reflective element 16 is disposed close to the adhesive element 14, and a gap is configured between the reflective element 16 and the adhesive element 14. The third step is to dispose a light guiding element 15 configured with a light emitting unit on the reflective element 16. The fourth step is to dispose a second frame 13 on the first frame 12, so that the adhesive element 14 is located between the first frame 12 and the second frame 13. To be noted, the first step and the fourth step can be performed, and then the second step and the third step are performed. Alternatively, the second step and the third step can be performed, and then the first step and the fourth step are performed, the disclosure is not limited.

In addition, the normal assembling procedure can further include the following steps. The fifth step is to solidify the adhesive element 14, wherein the adhesive element 14 can bond the first frame 12 to the second frame 13, the adhesive element 14 contacts at least a part of the bottom portion 121 and the side wall 122 of the first frame 12. The sixth step is to dispose at least one optical film 17 on the light guiding element 15. The seventh step is to dispose a display panel 11 on the optical film 17. The display panel 11 can be supported by the extension portion 132 of the second frame 13, and the display panel 11 is disposed corresponding to the first frame 12. The eighth step is to dispose a shielding adhesive element 18 at the peripheries of the display panel 11, the second frame 13 and the first frame 12.

As mentioned above, in the display device and assembling method thereof of this disclosure, the first frame is disposed corresponding to the display panel, the bottom portion of the first frame connects to the side wall. In addition, the adhesive element is disposed between the first frame and the second frame, so that the adhesive element contacts at least a part of the bottom portion and the side wall of the first frame. Accordingly, this disclosure can dispense the adhesive material on the first frame by the automatic dispensing apparatus. After pressing the first frame and the second frame and curing the adhesive material, the adhesive element can contact at least a part of the bottom portion and the side wall of the first frame. This configuration can adhere the second frame to the at least a part of the bottom portion and side wall of the first frame so as to achieve a stronger structural strength of the display device. Besides, this configuration is benefit to the application of narrow border automatic production so as to enhance the production yield or increase the product competitiveness.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device comprising:
    a display panel;
    a first frame disposed corresponding to the display panel and comprising a bottom portion and a side wall, wherein the bottom portion is connected to the side wall;
    a second frame disposed on the first frame, wherein the display panel is disposed on a part of the second frame;
    an adhesive element disposed between the first frame and the second frame, wherein the adhesive element contacts at least a part of the bottom portion and at least a part of the side wall; and
    a light guiding element disposed on the bottom portion wherein the bottom portion comprises a groove located between the side wall and the light guiding element, and the light guiding element and the groove are separated by a distance.

2. The display device according to claim 1, wherein the distance is greater than or equal to 1.0 mm.

3. The display device according to claim 1, wherein a cross-section of the groove is an arc shape, a sharp angle shape, a polygon, or a combination thereof.

4. The display device according to claim 1, wherein the groove is an annular groove viewed from a normal direction of the display panel.

5. The display device according to claim 1, wherein the groove is a patterned groove having a plurality of groove sections viewed from a normal direction of the display panel.

6. The display device according to claim 1, wherein the second frame has a first surface adjacent to the bottom portion, and at least a part of the groove is overlapped with the first surface.

7. The display device according to claim 1, wherein the groove has an internal wall, and the adhesive element contacts at least a part of the internal wall.

8. The display device according to claim 1, wherein the second frame comprises a main body portion, the main body portion has a first surface and a second surface, the first surface is adjacent to the bottom portion, the second surface is adjacent to the side wall, and the adhesive element contacts at least a part of the first surface and at least a part of the second surface.

9. The display device according to claim 8, wherein the second frame further comprises a plurality of protrusion portions connect to the first surface of the main body portion, the plurality of protrusion portions are separately disposed along an extending direction of the main body portion, and the plurality of protrusion portions are adjacent to the bottom portion.

10. The display device according to claim 9, wherein the adhesive element is disposed between the bottom portion and at least one of the plurality of protrusion portions.

11. The display device according to claim 9, wherein a first direction is defined as a direction perpendicular to the extending direction of the main body portion, and a width of one of the plurality of the protrusion portions along the first direction is equal to a width of the first surface of the main body portion along the first direction.

12. The display device according to claim 8, wherein the main body portion further has a notch and a third surface corresponding to the notch, the third surface connects to the first surface and the second surface, and the adhesive element contacts at least a part of the third surface.

13. The display device according to claim 12, wherein the notch has a bevel shape, an arc shape, an inverted arc shape, a polygonal structure, or a combination thereof.

14. An assembling method of a display device, comprising:
reversing a second frame;
disposing an adhesive element on a first frame, wherein the first frame comprises a bottom portion and a side wall, the bottom portion is connected to the side wall, and the adhesive element is disposed on at least a part of the bottom portion and at least a part of the side wall;
reversing the first frame disposed with the adhesive element and placing on the second frame, wherein the adhesive element is located between the first frame and the second frame; and
pressing the first frame and making the adhesive element contact at least a part of the bottom portion, at least a part of the side wall and at least a part of the second frame.

15. The assembling method according to claim 14, further comprising forming a groove on the bottom portion.

16. The assembling method according to claim 14, wherein before the step of adhering the first frame and the second frame by the adhesive element, the assembling method further comprises reversing a light guiding element on the second frame.

17. The assembling method according to claim 16, further comprising reversing a reflective element on the light guiding element.

18. The assembling method according to claim 17, further comprising:
turning the first frame, the second frame, the reflective element and the light guiding element, wherein the light guiding element is disposed upwardly;
disposing at least one optical film on the light guiding element; and
disposing a display panel on the at least one optical film, wherein the display panel is supported by the second frame and is disposed corresponding to the first frame.

19. The assembling method according to claim 14, further comprising disposing a shielding adhesive element at a periphery of the display panel, the first frame and the second frame.

* * * * *